C. FORD & D. F. HELMER.
ROTARY ENGINE.
APPLICATION FILED MAR. 30, 1908.

912,948.

Patented Feb. 16, 1909.
4 SHEETS—SHEET 1.

C. FORD & D. F. HELMER.
ROTARY ENGINE.
APPLICATION FILED MAR. 30, 1908.

912,948.

Patented Feb. 16, 1909.
4 SHEETS—SHEET 2.

Witnesses
A. Allgier
E. J. Noble

Inventors
Clark Ford
Delbert F. Helmer
Ithiel J. Cilley
Attorney

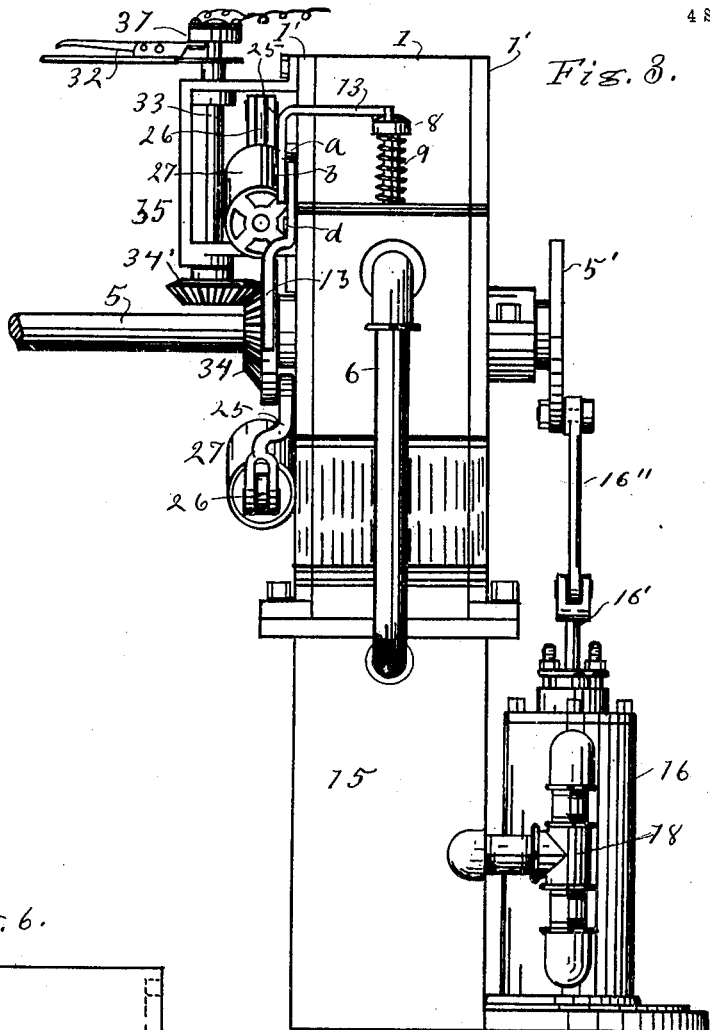
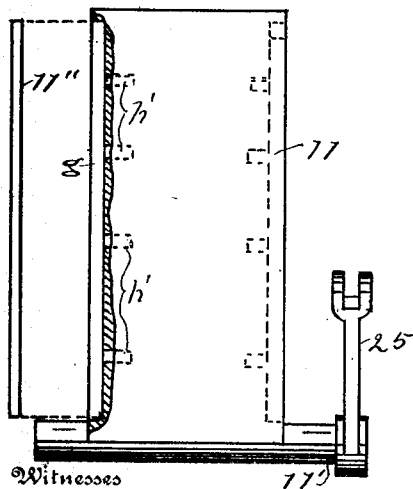
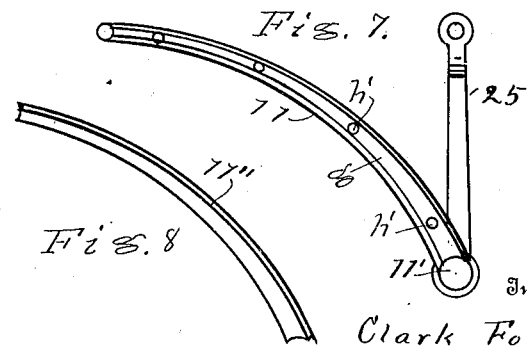

C. FORD & D. F. HELMER.
ROTARY ENGINE.
APPLICATION FILED MAR. 30, 1908.
912,948.
Patented Feb. 16, 1909.
4 SHEETS—SHEET 4.
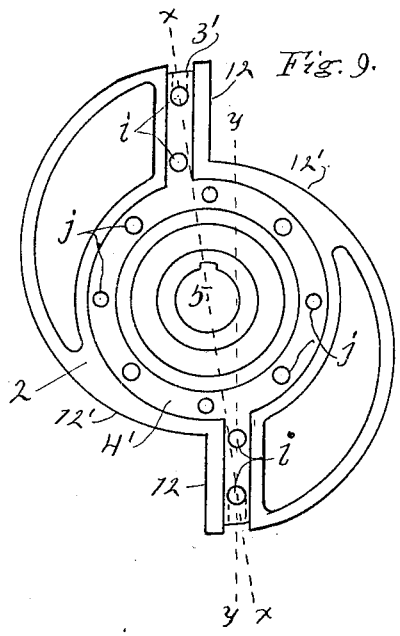
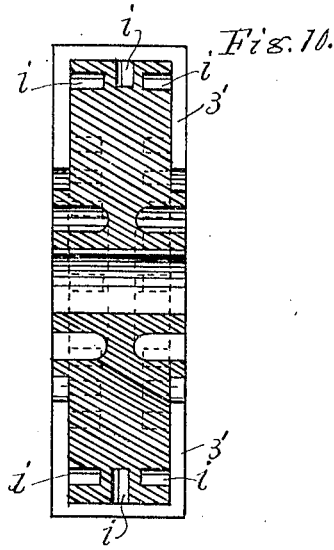
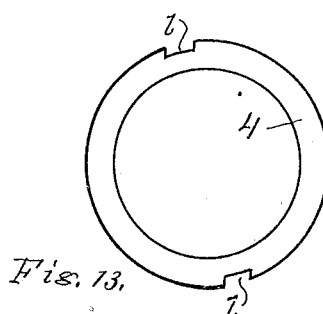
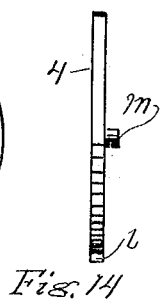
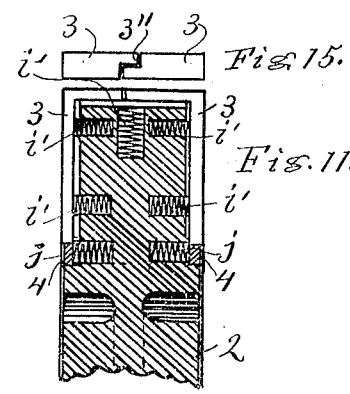
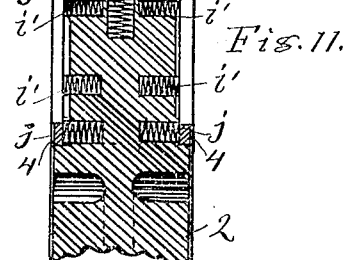
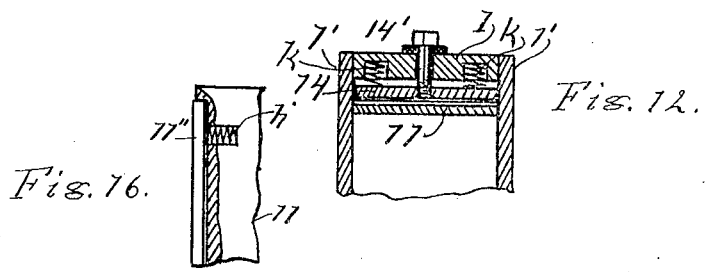
Witnesses
A. Allgier
E. J. Noble
Inventors
Clark Ford
Delbert F. Helmer
Ithiel J. Cilley
Attorney

UNITED STATES PATENT OFFICE.

CLARK FORD AND DELBERT F. HELMER, OF GRAND RAPIDS, MICHIGAN.

ROTARY ENGINE.

No. 912,948.  Specification of Letters Patent.  Patented Feb. 16, 1909.

Application filed March 30, 1908. Serial No. 424,280.

*To all whom it may concern:*

Be it known that we, CLARK FORD and DELBERT F. HELMER, citizens of the United States, residing at Grand Rapids, in the county of Kent and State of Michigan, have invented certain new and useful Improvements in Rotary Engines, of which the following is a specification.

While our invention relates more particularly to improvements in internal combustion engines, it relates, also to improvements in steam engines, and its object is to provide a thoroughly efficient rotary engine with which the full force of the explosive or expansive effort of the explosive or expansive element that is used for driving the engine may be utilized. We attain this object by the mechanism illustrated in the accompanying drawing in which—

Figure 1:
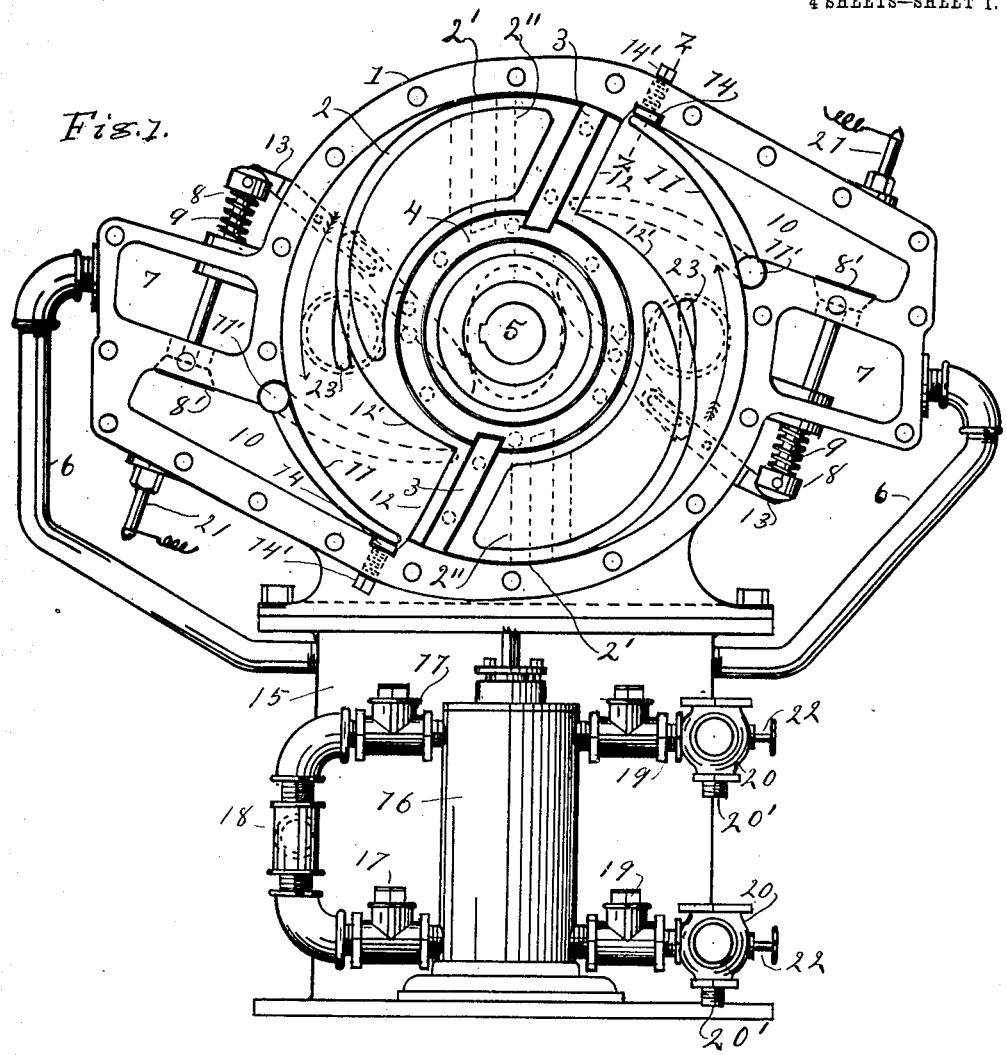
Figure 4:
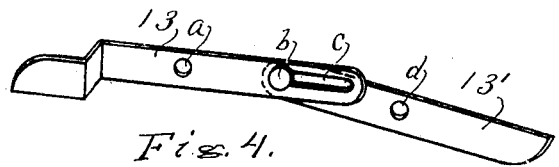
Figure 2:
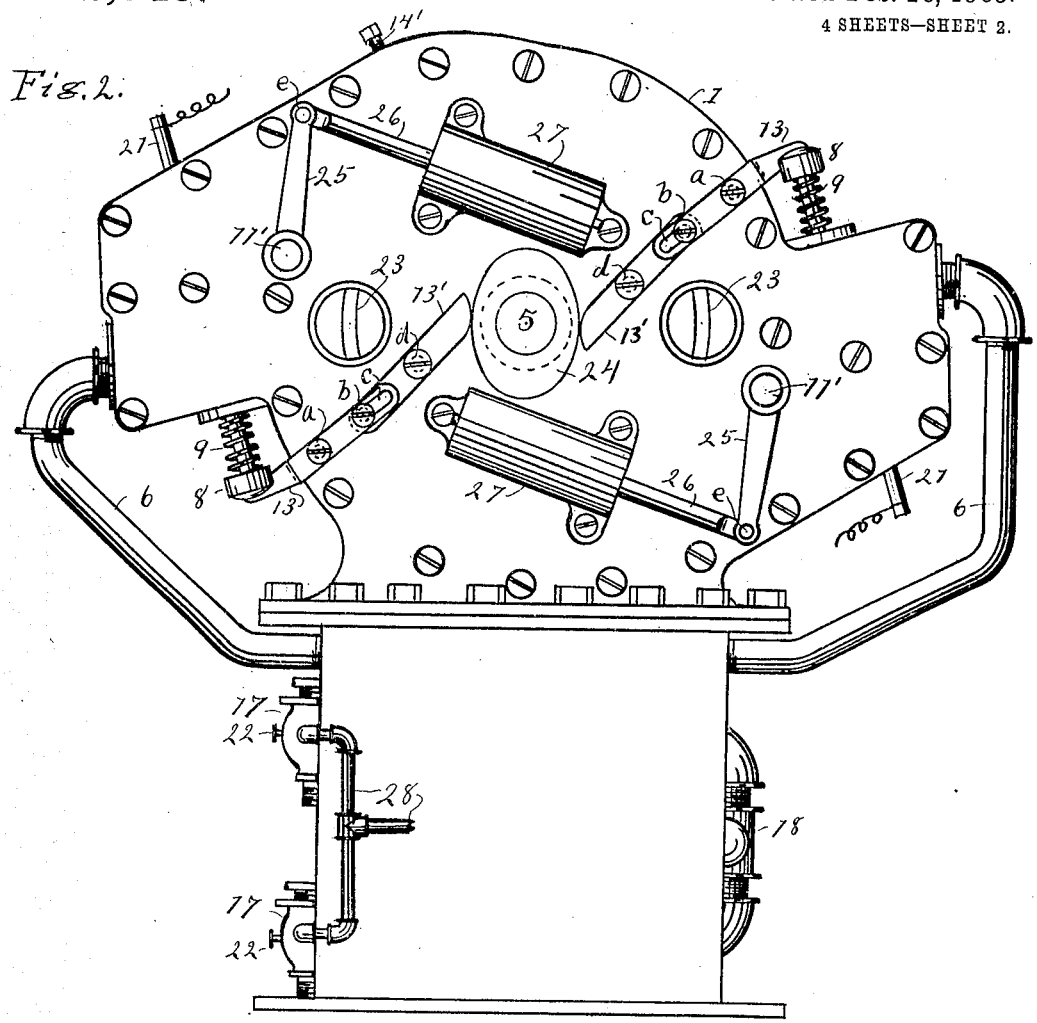
Figure 5:
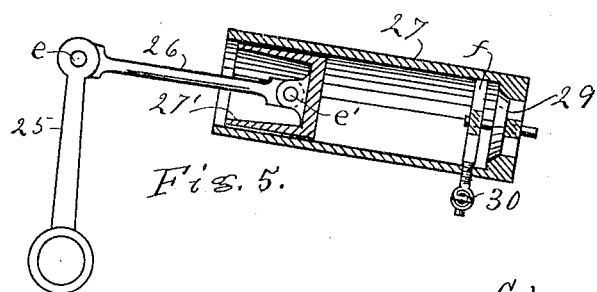

Figure 1 is a front elevation of the engine with the cylinder head or plate removed to show the internal construction of the cylinder. Fig. 2 is a back elevation of the same showing the several valve actuating levers, compression cylinders, exhaust ports, &c. Fig. 3 is a side view of the engine showing the location of the several parts. Fig. 4 is a detached view of the valve actuating levers. Fig. 5 is a longitudinal section of a compression cylinder showing its internal construction. Fig. 6 is a plan of the swinging gate or valve that opens and closes the explosion chamber to the face of the piston, with a portion cut away from one edge to show the manner of inserting the packing to insure perfect joints with the cylinder heads or plates. Fig. 7 is an edge elevation of the same. Fig. 8 is a perspective of the packing that is inserted in the edges of the gate. Fig. 9 is an elevation of the piston with the packing rings and slides removed. Fig. 10 is a sectional elevation of the same on the line x—x of Fig. 9. Fig. 11 is a like sectional view on the line v—v of Fig. 9. Fig. 12 is a sectional view of the cylinder on the line z—z of Fig. 1, showing a plate and springs for receiving the end of the gate as it is thrown up by the revolving piston body. Fig. 13 is an elevation of the packing ring. Fig. 14 is an edge view of the same. Fig. 15 is a plan of the packing slides that are used in the periphery of the piston, and Fig. 16 is a section of the gate showing the edge packing in place.

Similar characters refer to similar parts throughout the several views.

In the construction of this engine we make a cylinder portion 1 and inclose it with side plates 1' 1' in such a manner that the piston portion 2, mounted on the central shaft 5, will revolve freely between said plates. The piston portion 2 is formed with an outer periphery 2', the surface of which is formed, for a short distance, upon the same circle as is the inner surface of the cylinder 1, whence it diminishes regularly in size, forming the gradual incline 12' to the point of connection with the piston face 12, forming a long flat piston face from this point to the periphery of the piston, against which the expansive force of the explosive in the explosion chamber 10 acts to cause the piston member to revolve and carry the shaft 5 with it with great force. To confine the explosive force in the explosion chamber and insure the greatest possible efficiency upon the piston faces 12 12, we place a gate 11 between the opening of each explosion chamber and the face of the piston, with one end pivotally supported in the cylinder wall, as at 11', and the other end free to swing up and down, as indicated by the solid lines and the dotted lines in Fig. 1, and the gas valve 8' is arranged to be pressed open by the levers 13, 13', actuated by the elliptical cam 24, just as the piston member has reached the point where the end of the gate 11 is moved to contact with the receiving plate 14 when the gas is retained in the chamber 10 and the valve 8' is closed by the spring 9 acting upon the bolt head 8, until the piston passes to practically the position indicated by the dotted lines 2'' when the end of the gate, induced by the explosion of the gas in the explosion chamber 10, which is ignited by means of an electric spark introduced by the use of an ordinary sparking device, indicated at 21 21 in Figs. 1 and 2, is forced to contact with the surface of the inclined portion of the periphery of the piston portion 2, indicated at 12' and will confine the entire explosive force of the ignited gas in the chamber formed by the walls of the chamber 10, the face 12 of the piston 2 and the upper surface of the gate 11, so that the entire explosive force of the gas or the expansive force of steam confined in said chamber will be directly against the receding surface 12 of the piston member 2.

To avert the danger of the end of the gate being thrown against the surface 12' with great force we have placed air compression cylinders or pumps 27 upon the back plate or head 1' of the cylinder, which are provided with adjustable valves 29 so arranged that when the piston 27' is drawn toward the open end of the cylinder the valve 29 will be moved from its seat toward the bearing $f$ so that air will be admitted freely to the cylinder and when the piston is forced toward the other end of the cylinder the valve 29 will be forced upon its seat and will be closed so that a strong air cushion will be formed in the cylinder between this valve and the piston that will greatly retard the motion of the piston, though provisions must be made, as by allowing air to escape around the piston, or through a valve, as 30 in Fig. 5, in sufficient quantities to allow the piston to be forced to the extreme limit of its travel. The piston 27' is actuated by the crank arm 25, which is securely attached, at one end, to the shaft or pivotal bearing 11' upon which the gates 11 are pivoted in the cylinder member 1 so that any movement of the gates 11 is given to the crank arms 25, and these crank arms are connected with the pistons 27' by means of the connecting rods 26, pivoted at $e$ to the end of the arms 25 and at $e'$ to the pistons 27'.

To avert the danger of the expanding gases forcing themselves between the sides and periphery of the piston member 2 of the engine and the walls of the cylinder member 1 1', we have placed a packing ring 4 in each side of the piston member, as in the receptacle 4', and place any available form of spring, as indicated by the springs $j'$ in the openings $j$, in position to force the rings outward, and the portions of the piston immediately back of the faces 12 are protected by means of plates 3 set into the bearings 3' and actuated by any available form of springs. In this case we have shown small spiral springs $i'$ seated in bearings $i$ $i$ and arranged to press both sidewise and outward upon the plates. The plates 3 are divided or made in two pieces and are fitted to overlap on the periphery of the piston so that the sidewise movement of the plates may be attained without danger of the expanding gases passing between the meeting ends of the plates, more plainly shown at 3" in Fig. 15.

To avert the danger of the free end of the gate 11 being made to strike solidly against a firm surface and marring the surface or, perhaps, breaking the gate in two, we have placed a plate 14 in the cylinder walls, which plate is held to place by a bolt or bolts, as 14', made to slide freely through the walls of the cylinder, and we place any available form of spring or springs, as $k$ $k$ back of this plate to force it outward toward the approaching gate, and to allow the plate to move back as the end of the gate approaches it, thus greatly relieving the force of the stroke of the gate against its bearing in the surface of the cylinder member 1.

The indents 1 1 in the periphery of the ring 4, shown in Figs. 1 and 13, are meant to receive the ends of the plates 3 3 to form, as nearly as possible, gas tight joints at these points even though the plates 3 3 may move endwise in their bearings.

We find it well to place an adjustable packing 11" in the bearings $g$ in the edges of the gates 11 and to provide some means for forcing them outward, as by the use of springs $h$ seated in depressions $h'$, to insure gas tight joints between the edges of the gates and the sides or heads of the cylinder.

The levers 13, that actuate the bolts 8 to open the valves 8', are pivotally secured to the cylinder plate 1' as at $a$, and the inner ends thereof are provided with slots $c$ $c$ arranged to engage the bolts $b$ $b$ that are secured to the ends of the levers 13' 13', which levers are pivotally secured to the cylinder plate in position so that the free ends thereof come in contact with the surface of the elliptical cam 24, which, in turn, is securely fastened to the shaft 5 so that when the shaft 5 is made to revolve the contact ends of the levers 13' 13' are made to oscillate by the elliptical form of the cam 24, and to actuate the lever 13 to force the bolt 8 to move endwise in its bearings, against the tension of the springs 9, to open and close the valve 8' as desired for admitting and confining gas in the chamber 10.

We provide for forcing the gasolene, naphtha, or other hydrocarbon, or wood alcohol or other explosive into this engine by the use of any form of available pump, as shown at 16 in Figs. 1 and 3. The explosive is conducted or drawn to this pump through a pipe, as 28, and the supply is governed by the use of pin valves 22, in the valves 20, and air is drawn into these valves through any suitable aperture, as, for instance, through the pipes 20', with each upward or downward stroke of the pump piston; the back flow of such explosive and air being prevented by the check valves 19 19, and the compound is forced into the mixing chamber 15 through the check valves 17 17 and the pipe 18, and thence to the storage chambers 7 through the pipes 6, under considerable pressure so that when the valves 8' are opened, as hereinbefore described, the compound is forced into the explosion chamber with sufficient force to overcome any pressure that may remain in said chamber from the next preceding explosion. The pump 16 is driven from the shaft 5 through the medium of the crank 5', the connecting rod 16" and the piston rod 16', in the usual manner of driving reciprocating pumps. We have shown this form of pump simply as an illustration of how the gas laden air is forced into the cylinder, but it is patent that the same results may be attained with the use of any available form of pump.

The pin $m$, shown in Fig. 14, is sometimes desirable to pass into one or more of the holes $j'$ to prevent the rings 4 from turning in their bearings 4', but the engagement of the indents 1 1 by the plates 3 3 will hold the rings to place without difficulty.

The exhaust for this engine is placed in position so that the piston will revolve about one quarter of a revolution after the explosion takes place before the gases can escape through the exhaust orifice 23, and it should be so arranged that an exhaust pipe can be connected, if desired.

31, 32 and 33 represent the several parts of an ordinary sparking device supported in the yoke 35 and driven from the main shaft 5 through the medium of the bevel gears 34 and 34', as clearly indicated in Fig. 3.

What we claim as new and desire to secure by Letters Patent of the United States, is:

1. In a rotary engine, a cylinder having explosion chambers and exhaust ports therein, a piston journaled on a shaft to revolve freely in the cylinder, spring actuated packing rings and plates in the piston, the piston constructed to form radiating faces with inclined surfaces extending from the inner end of each to the periphery of the piston near the outer end of the other face, gates pivoted at one end to the walls of the cylinder to open and close the expansion chambers to admit pressure to and to cut it off from the faces of the piston, spring actuated plates in the walls of the cylinder to receive the impact of the free ends of the gates when carried outward to close the expansion chambers, and valves and sparkers for admitting and igniting gas in the expansion chambers.

2. In a rotary engine, a cylinder having expansion chambers and exhaust ports, a piston centrally journaled to revolve freely in the cylinder and constructed to form radiating faces and inclined surfaces extending from the inner end of the faces to the periphery of the piston, gates pivoted in the cylinder to open and close the expansion chambers to the cylinder, shafts carrying said gates and extending through the side walls of the cylinder, arms secured to said shafts outside of the cylinder, compression cylinders secured to the cylinder, air valves located in said compression cylinders, pistons therein, rods connecting the arms to the pistons in the compression cylinders and so arranged that the air compressed in the compression cylinders will regulate the inward motion of the gates, and valves and sparkers arranged to admit gas to the expansion chambers and ignite it at the proper time.

3. In a rotary engine, a cylinder having exhaust ports, storage chambers and explosion chambers, a shaft carrying a suitable piston to revolve freely in the cylinder, gates for opening and closing the explosion chambers to the cylinder, valves seated to open between the storage chambers and the expansion chambers and stems extending therefrom to position outside of the chambers to be actuated by levers, levers pivoted to the outside of the cylinder in position to actuate the valve stems, an elliptical cam secured to the main shaft in position to actuate the valve levers, and pipes leading into the storage chambers.

4. In a rotary engine, a cylinder having storage chambers, expansion chambers and exhaust ports, a shaft, a piston centrally mounted on the shaft to revolve freely in the cylinder, packing rings and plates in the piston, said plates divided and made to lap by each other on the periphery of the piston and the ends engaging the rings, shafts revolubly mounted in the walls of the cylinder, gates secured to said shafts inside the cylinder and arms secured to them outside of the cylinder, compression cylinders secured to the engine cylinder and having reciprocating pistons and air valves therein, rods connecting these pistons with the arms on the gate shafts, valves located between the storage chambers and the expansion chambers, stems extending from said valves outside of the storage chambers, levers pivotally secured to the engine cylinder, cams on the piston shaft to actuate these levers and through them the valves, and pipes leading into the storage chambers.

5. In a rotary engine, a cylinder having storage chambers, explosion chambers and exhaust ports, a shaft passing through the cylinder, a piston centrally mounted on said shaft to revolve freely in the cylinder, radial faces formed on the piston, inclined surfaces extending from the inner ends of these faces to the periphery of the piston, gates pivoted to the walls of the cylinder to open and close the passage between the explosion chambers and the cylinder, valves opening between the storage chambers and the expansion chambers and having stems that project outside of the storage chambers, levers pivoted to the cylinder, cams on the piston shaft arranged to actuate the valves between the storage chambers and the expansion chambers, arms connected with the gates and arranged to regulate their inward movements, a mixing chamber, a pump, pipes and valves for forcing liquid laden air into the mixing chamber and thence into the storage chamber and cylinder, and electric sparking devices for igniting the gas in the expansion chamber.

Signed at Grand Rapids Michigan March 24, 1908.

CLARK FORD.
DELBERT F. HELMER.

In presence of:
A. ALLGIER,
I. J. CILLEY.